US 10,794,403 B2

(12) United States Patent
Yamada et al.

(10) Patent No.: US 10,794,403 B2
(45) Date of Patent: Oct. 6, 2020

(54) COMPOSITE VALVE FOR DIRECT ATTACHMENT TO PORT OF HYDRAULIC APPARATUS

(71) Applicant: SMC CORPORATION, Chiyoda-ku (JP)

(72) Inventors: Hirosuke Yamada, Tsukubamirai (JP); Seikai Yo, Toride (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 16/346,384

(22) PCT Filed: Nov. 7, 2017

(86) PCT No.: PCT/JP2017/040012
§ 371 (c)(1),
(2) Date: Apr. 30, 2019

(87) PCT Pub. No.: WO2018/092629
PCT Pub. Date: May 24, 2018

(65) Prior Publication Data
US 2020/0056632 A1 Feb. 20, 2020

(30) Foreign Application Priority Data

Nov. 18, 2016 (JP) .................................. 2016-225468

(51) Int. Cl.
*F15B 11/04* (2006.01)
*F16K 11/22* (2006.01)
(Continued)

(52) U.S. Cl.
CPC .............. *F15B 11/04* (2013.01); *F15B 11/06* (2013.01); *F15B 13/01* (2013.01);
(Continued)

(58) Field of Classification Search
CPC .......... F15B 11/04; F15B 11/06; F16K 11/10; F16K 11/14; F16K 11/20; F16K 11/22; F16K 15/18
See application file for complete search history.

(56) References Cited

U.S. PATENT DOCUMENTS 1,234,930 A * 7/1917 Niebling ................. F16K 11/20
137/637
5,081,904 A 1/1992 Horn et al.
(Continued)

FOREIGN PATENT DOCUMENTS

| | | |
|---|---|---|
| CN | 102691810 A | 9/2012 |
| JP | 5-60253 A | 3/1993 |

(Continued)

OTHER PUBLICATIONS

International Search Report dated Jan. 9, 2018 in PCT/JP2017/040012 filed on Nov. 7, 2017.
(Continued)

*Primary Examiner* — Kevin L Lee
(74) *Attorney, Agent, or Firm* — Oblon, McClelland, Maier & Neustadt, L.L.P.

(57) ABSTRACT

A composite valve includes a valve body, a first valve module, and a second valve module. The valve body includes a first body portion to which the first valve module is attached, a second body portion to which the second valve module is attached, a third body portion that has an input port, and a fourth body portion that has an output port and an attachment portion. The first body portion and the second body portion respectively extend along a first axis and a second axis that are parallel to each other. The third body portion extends along a third axis that is at 90 degrees with respect to the first axis and with respect to the second axis. The fourth body portion extends along a fourth axis L4 that
(Continued)

is at 90 degrees with respect to all the first axis, the second axis, and the third axis.

7 Claims, 10 Drawing Sheets

(51) Int. Cl.
    *F15B 11/06*     (2006.01)
    *F15B 13/01*     (2006.01)
    *F16K 15/14*     (2006.01)
    *F16K 15/18*     (2006.01)

(52) U.S. Cl.
    CPC ..... *F15B 2211/30505* (2013.01); *F16K 11/22* (2013.01); *F16K 15/14* (2013.01); *F16K 15/18* (2013.01)

(56) References Cited

U.S. PATENT DOCUMENTS

| | | | |
|---|---|---|---|
| 5,305,777 A * | 4/1994 | Nakamura et al. | F15B 11/06 |
| | | | 137/102 |
| 10,627,007 B2 * | 4/2020 | Suga et al. | F16K 31/122 |
| 2017/0261008 A1 | 9/2017 | Hama | |

FOREIGN PATENT DOCUMENTS

| | | |
|---|---|---|
| JP | 7-42854 A | 2/1995 |
| JP | 5756984 B1 | 7/2015 |

OTHER PUBLICATIONS

Office Action dated May 7, 2020 in Chinese Patent Application No. 201780071117.0, with English translation.

* cited by examiner

COMPOSITE VALVE FOR DIRECT ATTACHMENT TO PORT OF HYDRAULIC APPARATUS

TECHNICAL FIELD

The present invention relates to a composite valve that is used by being directly attached to a port of a hydraulic apparatus.

BACKGROUND ART

For example, a speed controller is a well-known example of a composite valve that is used by being directly attached to a port of a fluid pressure cylinder, which is a type of au. As disclosed in Patent Literatures (PTL 1 to PTL 3), such a speed controller includes a check valve that controls a pressure fluid so as to flow only in one direction, which is a forward direction or a backward direction, and a needle valve that controls the flow rate of the pressure fluid, these valves being incorporated within a valve body, and is used for controlling the operating speed of a fluid pressure cylinder.

However, along with the recent increase in the variety of operational controls of fluid pressure cylinders, there has been a demand for increase in the variety of control functions of this type of composite valve, and this type of composite valve is often required to have, in addition to or instead of a function of controlling the operating speed of a fluid pressure cylinder, for example, a function of causing a pressure fluid to be contained in a fluid pressure cylinder at the time of emergency stop of the fluid pressure cylinder and a function of discharging the residual pressure contained in the fluid pressure cylinder.

Although such a composite valve can be obtained by incorporating a plurality of valve mechanisms having different control functions within a valve body, in this case, a plurality of types of composite valves having different combinations of control functions need to be manufactured, and it is necessary to select the composite valves depending on applications and use the composite valves having control functions suitable for the applications. However, in such a method, a large number of types of composite valves need to be manufactured. Consequently, for example, a decrease in productivity is likely to occur, and management of products is likely to become complex. Therefore, it is desirable to minimize the number of types of composite valves to be manufactured.

In addition, in the case where a plurality of valve mechanisms having different control functions are incorporated within a single valve body, the entire size of a composite valve becomes large, and thus, when this composite valve is attached to a port of a fluid pressure cylinder, the composite valve greatly projects in the axial direction of the port. Consequently, when this fluid pressure cylinder is installed in an industrial robot or the like, a large installation space is required around the fluid pressure cylinder. Therefore, it is desirable that a composite valve be formed as low in height as possible and as small in size as possible.

CITATION LIST

Patent Literature

PTL 1: Japanese Unexamined Patent Application Publication No. 5-60253

PTL 2: Japanese Unexamined Patent Application Publication No. 7-42854

PTL 3: Japanese Patent No. 5756984

SUMMARY OF INVENTION

Technical Problem

It is a technical object of the present invention to eliminate the necessity to manufacture a plurality of types of composite valves having different combinations of control functions by making it possible to a composite valve that has a combination of control functions according to an application with a plurality of valve mechanisms (valve modules) that are modularized for each control function and a valve body to which these valve modules are attachable and to enable such a composite valve to be compactly attached, in as a low position as possible, to a port of a fluid pressure apparatus.

Solution to Problem

To solve the above problem, a composite valve according to the present invention includes a valve body, a first valve module attached to the valve body, and a second valve module attached to the valve body. The valve body includes a first body portion having an attachment hole that is used for attaching the first valve module to the first body portion, a second body portion having an attachment hole that is used for attaching the second valve module to the second body portion, a third body portion having an input port that is used for injecting a pressure fluid into the third body portion, and a fourth body portion having an output port that is used for outputting the pressure fluid, the first body portion, the second body portion, the third body portion, and the fourth body portion being formed in such a manner as to be integrally coupled to one another. The fourth body portion includes an attachment portion that is formed in such a manner as to be directly screwed into and attached to a port of a fluid pressure apparatus, the port having a shape of a threaded hole. The first body portion and the second body portion respectively extend along a first axis and a second axis that are parallel to each other. The third body portion is located in a first plane including either or both of the first axis and the second axis or is located in a second plane that is parallel to the first plane and extends along a third axis that is at 90 degrees with respect to the first axis and with respect to the second axis. The fourth body portion extends along a fourth axis that is at 90 degrees with respect to all the first axis, the second axis, and the third axis. The first valve module includes a module body that is attachable to the first body portion by being inserted into the attachment hole of the first body portion and a valve mechanism that is assembled to the module body, and the second valve module includes a module body that is attachable to the second body portion by being inserted into the attachment hole of the second body portion and a valve mechanism that is assembled to the module body. The first valve module and the second valve module have different fluid control functions. A fluid flow path that allows the input port and the output port to communicate with each other is formed in such a manner as to extend from the third body portion to the fourth body portion by sequentially passing through the first body portion, the first valve module, the second body portion, and the second valve module from one side to another side.

According to a preferred embodiment of the present invention, the first body portion, the second body portion, the third body portion, and the fourth body portion each have a hollow cylindrical shape. The first body portion and the second body portion are disposed at positions that are adjacent to each other in such a manner that the first body portion and the second body portion overlap each other. A first attachment hole of the first body portion and a second attachment hole of the second body portion are open along the first axis and the second axis, respectively, and are oriented in opposite directions.

In this case, it is desirable that the third body portion and the fourth body portion be disposed at positions located on opposite sides with the first body portion or the second body portion interposed between the third body portion and the fourth body portion. It is particularly desirable that the first body portion, the second body portion, and the third body portion be arranged in such a manner that the entire first body portion, the entire second body portion, and the entire third body portion are fit into an area having a height of the fourth body portion.

According to a preferred embodiment of the present invention, the fourth body portion includes a hollow outer body and an inner body that has a cylindrical shape and that is accommodated in the outer body in such a manner as to be rotatable about the fourth axis. An upper end of the inner body is exposed to the outside from an upper end of the outer body, and a lower end of the inner body projects outward from a lower end of the outer body. A fluid flow path is formed in the inner body, and an attachment portion and an output port are formed at a lower end portion of the inner body. An operation portion that is used for performing a turning operation by using a wrench is formed at an upper end portion of the inner body.

In the present invention, the first valve module and the second valve module are each attachable to the first body portion and to the second body portion. In addition, in the present invention, a combination of the first valve module and the second valve module is a combination of a speed controller and a pilot check valve, a combination of a pilot check valve and a residual pressure discharge valve, or a combination of a speed controller and a speed controller. A valve mechanism of each of the speed controllers includes a check valve body that controls a flow direction of the pressure fluid that flows through the fluid flow path and a needle valve that controls a flow rate of the pressure fluid. A valve mechanism of the pilot check valve includes a check valve body that controls a flow direction of the pressure fluid that flows through the fluid flow path, a pilot valve body that displaces, by an action of a pilot fluid, the check valve body to a position where the check valve allows a flow of the pressure fluid in a forward direction and a flow of the pressure fluid in a backward direction, and a pilot port that is used for supplying the pilot fluid to the pilot valve body. A valve mechanism of the residual pressure discharge valve includes a discharge flow path that branches off from the fluid flow path and that communicates with the outside and a discharge valve body that opens and closes the discharge flow path.

Advantageous Effects of Invention

According to the present invention, by attaching valve modules each having a necessary control function to a first body portion and to a second body portion of a valve body, a composite valve that has a combination of control functions according to an application can be easily obtained. In addition, a plurality of body portions forming a valve body are arranged in a logical manner and compactly coupled to one another, so that a composite valve can be compactly attached, in a low position, to a port of a fluid pressure apparatus.

DESCRIPTION OF EMBODIMENTS

Figure 1:
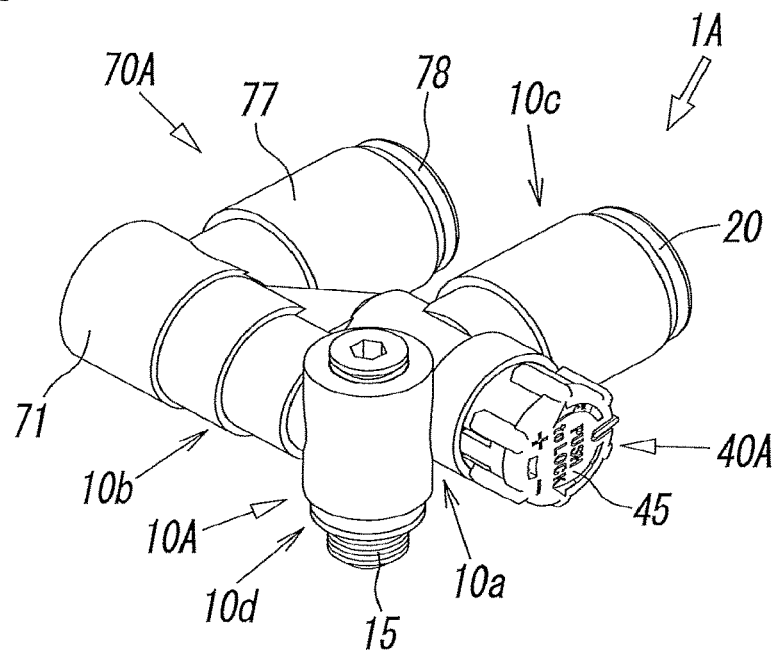
FIG. 1 is a perspective view illustrating a composite valve according to a first embodiment of the present invention.
Figure 2:
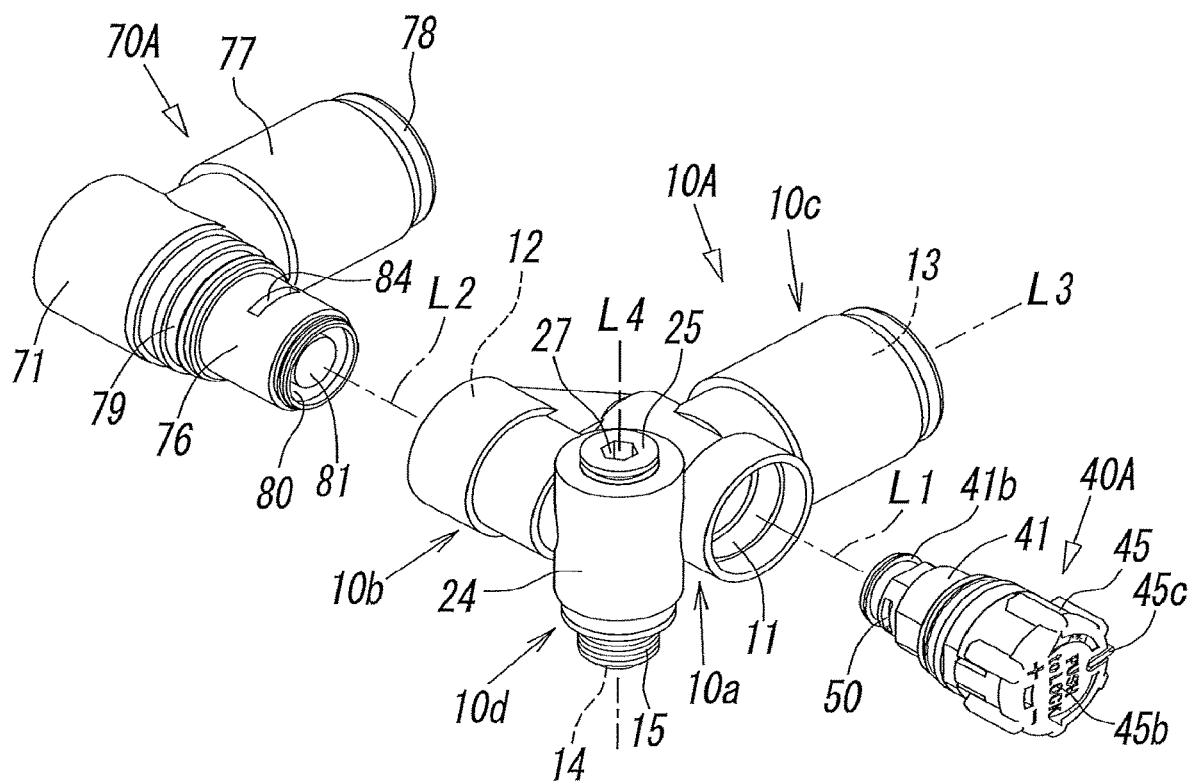
FIG. 2 is an exploded view of FIG. 1.
Figure 3:
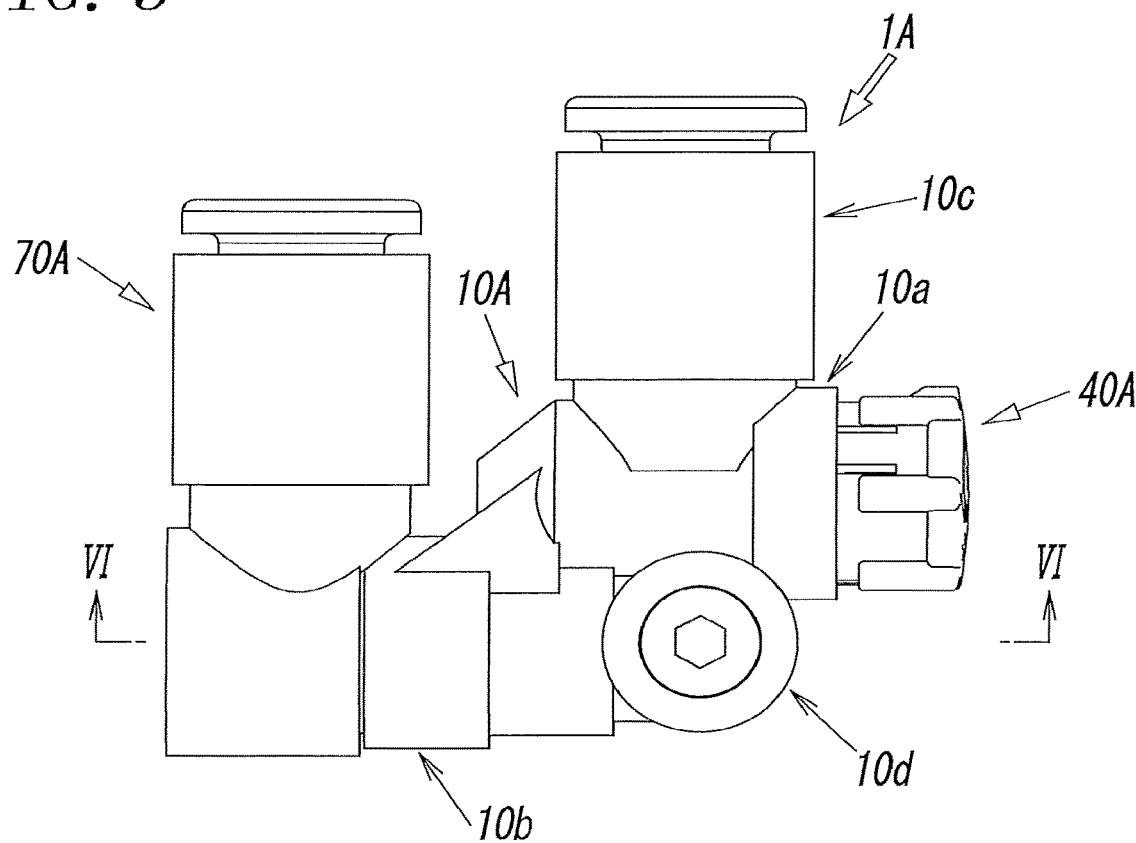
FIG. 3 is a plan view of FIG. 1.

FIG. 1 to FIG. 8 illustrate a composite valve according to a first embodiment of the present invention. A first composite valve 1A according to the first embodiment is used by being directly attached to a port 111 (see FIG. 4) of a fluid pressure apparatus 110 and includes a single valve body 10A, a first valve module 40A, and a second valve module 70A, the first valve module 40A and the second valve module 70A being attached to the valve body 10A.

The first valve module 40A and the second valve module 70A have different fluid control functions. The first valve module 40A has a function of serving as a speed controller, and the second valve module 70A has a function of serving as a pilot check valve. By using such a combination of control functions, when a fluid pressure circuit operates normally, the first valve module 40A of the first composite valve 1A can control the operating speed of the fluid pressure apparatus 110, and when supply of a pressure fluid is stopped due to an abnormality in the fluid pressure circuit, the second valve module 70A of the first composite valve 1A can cause the pressure fluid to be contained in the fluid pressure apparatus 110 and can stop the fluid pressure apparatus 110 at a position where the fluid pressure apparatus 110 has been operating at that time.

Note that, in the present embodiment, the fluid pressure apparatus 110 is an air cylinder, and the pressure fluid is air. Accordingly, in the following description, the air cylinder may sometimes be denoted by the reference sign 110.

The valve body 10A is made of a metal, such as an aluminum alloy, a synthetic resin, or the like and includes a first body portion 10a having a first attachment hole 11 that is used for attaching the first valve module 40A to the first body portion 10a, a second body portion 10b having a second attachment hole 12 that is used for attaching the second valve module 70A to the second body portion 10b, a third body portion 10c having an input port 13 that is used for injecting the pressure fluid into the third body portion 10c, and a fourth body portion 10d having an output port 14 that is used for outputting the pressure fluid, the first to fourth body portions 10a, 10b, 10c, and 10d being integrally coupled to one another. An attachment portion 15 that is directly screwed into and attached to the port 111 of the fluid pressure apparatus 110, the port 111 having the shape of a threaded hole, is formed at a portion of the fourth body portion 10d where the output port 14 is formed.

Although the valve body 10A may be formed by forming a plurality of separate portions and then coupling these portions into one body, it is desirable that all the portions of the valve body 10A excluding an inner body 25 of the fourth body portion 10d be integrally formed into a single body.

The first body portion 10a, the second body portion 10b, the third body portion 10c, and the fourth body portion 10d each have a hollow cylindrical shape. The first body portion 10a extends along a first axis L1. The second body portion 10b extends along a second axis L2 that is parallel to the first axis L1. The third body portion 10c extends along a third axis L3 that is at 90 degrees with respect to the first axis L1 and with respect to the second axis L2. The fourth body portion 10d extends along a fourth axis L4 that is at 90 degrees with respect to all the first axis L1, the second axis L2, and the third axis L3.

The first body portion 10a and the second body portion 10b are disposed at positions where the first body portion 10a and the second body portion 10b are adjacent to each other in such a manner that a side surface of the first body portion 10a and a side surface of the second body portion 10b overlap each other. The first attachment hole 11 of the first body portion 10a and the second attachment hole 12 of the second body portion 10b are open along the first axis L1 and the second axis L2, respectively, and are oriented in opposite directions.

The third body portion 10c and the fourth body portion 10d are disposed at positions located on opposite sides with the first body portion 10a interposed therebetween. Although the fourth axis L4 of the fourth body portion 10d and the second axis L2 of the second body portion 10b are located within the same vertical plane circle, the fourth axis L4 and the second axis L2 may have a positional relationship in which the fourth axis L4 and the second axis L2 are slightly displaced from each other in the direction of the third axis L3. Alternatively, the third body portion 10c and the fourth body portion 10d can be disposed at positions located on opposite sides with the second body portion 10b interposed therebetween or can be disposed at positions located on opposite sides with both the first body portion 10a and the second body portion 10b interposed therebetween.

Note that, in the example illustrated in the drawings, although the first axis L1, the second axis L2, and the third axis L3 are located in the same plane, all the axes are not necessarily located in the same plane. For example, the first axis L1 may be located in a first plane, and the second axis L2 may be located in a second plane that is parallel to the first plane. The third axis L3 may be located in a third plane that is parallel to the first plane and to the second plane. Alternatively, the first axis L1 and the second axis L2 may be located in the first plane, and the third axis L3 may be located in the third plane that is parallel to the first plane. It is important to arrange the first body portion 10a, the second body portion 10b, and the third body portion 10c in such a manner that the entire body portions 10a, 10b, and 10c excluding the attachment portion 15 of the fourth body portion 10d are fit into an area having a height H.

Figure 4:
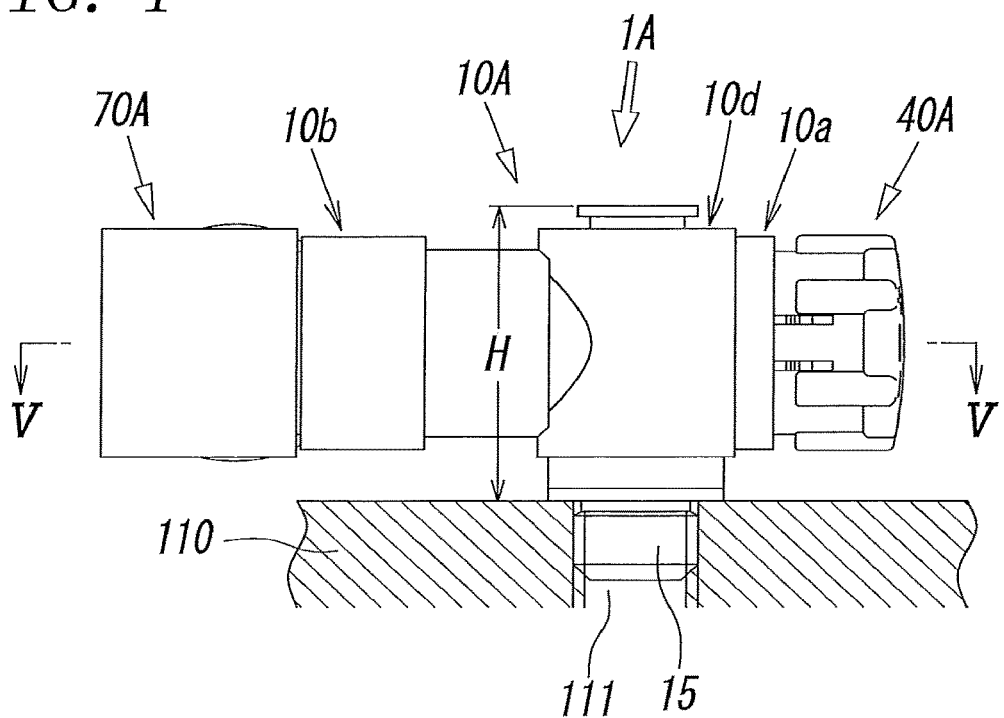
FIG. 4 is a front view of FIG. 3.

The four body portions 10a to 10d are arranged in this manner, so that the composite valve 1A can be compactly attached, in a low position, to the port 111 of the fluid pressure apparatus 110 as illustrated in FIG. 4.

Figure 5:
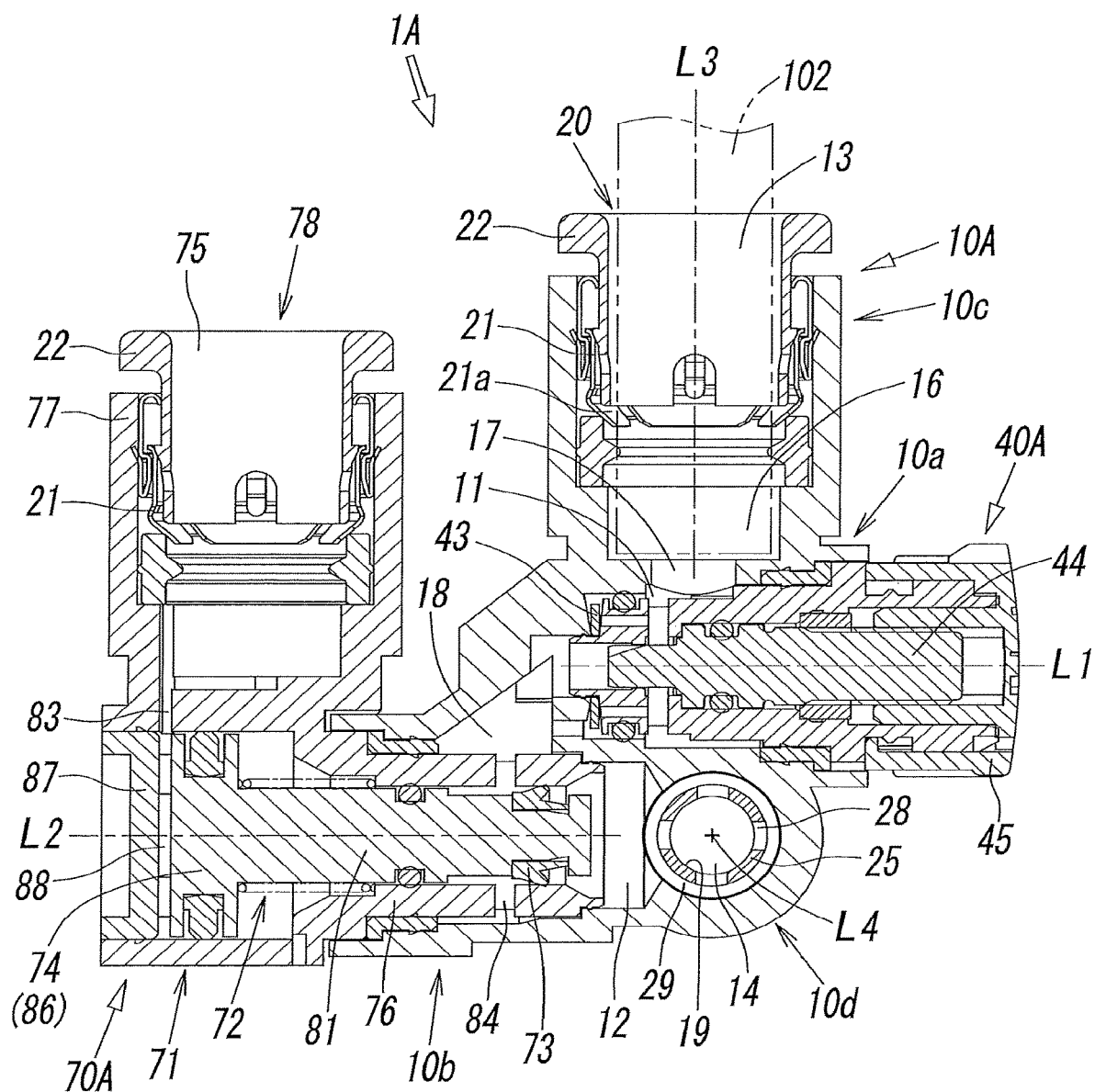
FIG. 5 is an enlarged cross-sectional view taken along line V-V of FIG. 4.

As is clear from FIG. 5, a flow path hole is formed in the valve body 10A, the flow path hole forming a fluid flow path that allows the input port 13 and the output port 14 to communicate with each other. This flow path hole is formed of an input hole 16 that is formed in the third body portion 10c, the first attachment hole 11 that is formed in the first body portion 10a, an input communication hole 17 that causes the input hole 16 to communicate with the first attachment hole 11, the second attachment hole 12 of the second body portion 10b, a connection hole 18 that allows an end portion of the first attachment hole 11 and a side surface portion of the second attachment hole 12 to communicate with each other, and an output hole 19 that extends in the fourth body portion 10d. When the first valve module 40A is attached to the first attachment hole 11, and the second valve module 70A is attached to the second attachment hole 12, the fluid flow path, which allows the input port 13 and the output port 14 to communicate with each other, is formed so as to extend from the input hole 16 of the third body portion 10c to the output hole 19 of the fourth body portion 10d sequentially passing through the input communication hole 17, the first body portion 10a, the first valve module 40A, the connection hole 18, the second body portion 10b, and the second valve module 70A.

A simple connection pipe joint 20 is attached to the input port 13 of the third body portion 10c. When a pipe (a tube) 102 that is made of a synthetic resin is inserted into the pipe joint 20, edges 21a of an engagement member 21 engages the outer periphery of the pipe 102 so as to maintain the pipe 102 in a state of being prevented from coming out of the pipe joint 20. When a cylindrical release bushing 22 is pushed along the pipe 102, an end of the release bushing 22 releases the engagement of the edge 21a, so that the pipe 102 can be pulled out.

Figure 6:
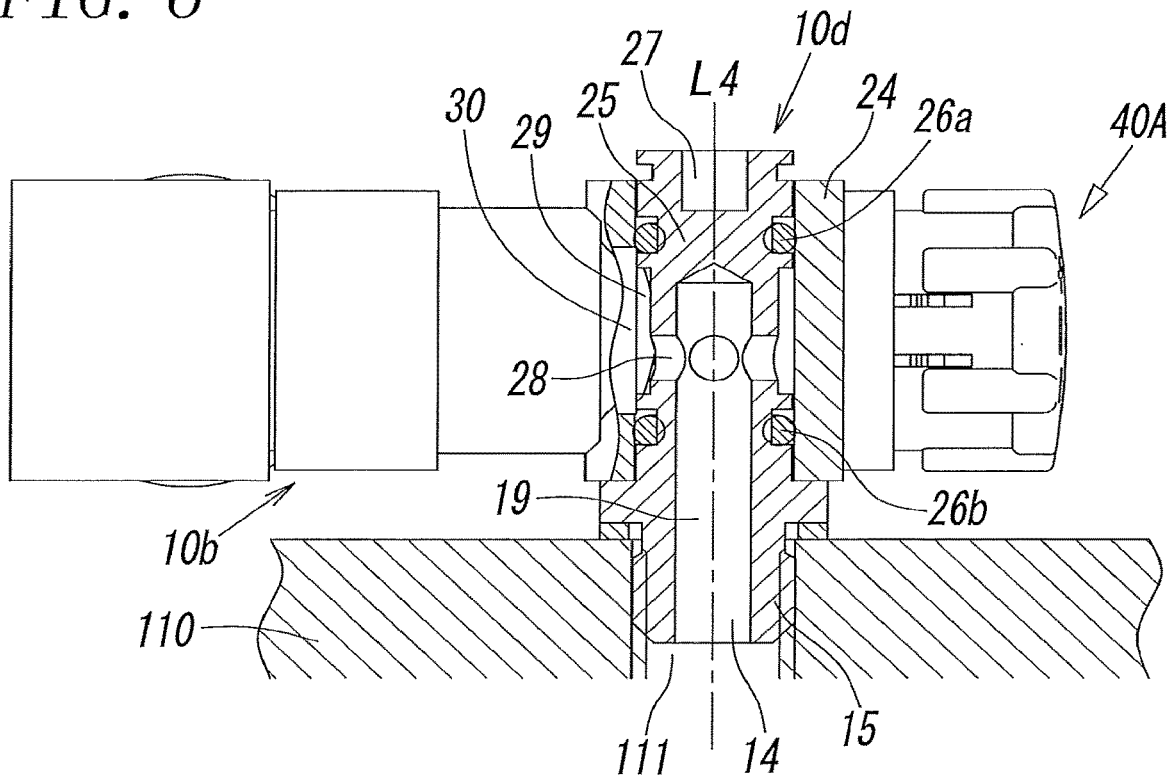
FIG. 6 is a partial cross-sectional view taken along line VI-VI of FIG. 3.

As illustrated in FIG. 6, the fourth body portion 10d includes a hollow outer body 24 and the inner body 25 that has a cylindrical shape and that is accommodated in the outer body 24 so as to be rotatable about the fourth axis L4. Two seal members 26a and 26b are disposed between the outer periphery of the inner body 25 and the inner periphery of the outer body 24 with a distance between the two seal members 26a and 26b.

The upper end and the lower end of the inner body 25 project outward from the upper end and the lower end of the outer body 24, respectively. The output port 14 and the attachment portion 15 that has the outer peripheral surface on which an external thread is cut are formed at a lower end portion of the inner body 25. An operation portion 27 formed of a hexagon socket is formed at an upper end portion of the inner body 25, and when the attachment portion 15 is screwed into the port 111 of the fluid pressure apparatus 110, a wrench is inserted into the operation portion 27 so as to perform a turning operation. It is not necessary for the upper end portion of the inner body 25 to project outward from the upper end of the outer body 24 as long as the upper end portion of the inner body 25 is exposed to the outside.

A lower end portion of the output hole 19, which extends through the inner body 25 at the center of the inner body 25, communicates with the output port 14, and an upper end portion of the output hole 19 communicates with the second attachment hole 12 at a position between the two seal members 26a and 26b through a plurality of communication holes 28 that are formed in a side surface of the inner body 25, an inner hole 29 of the outer body 24, and an opening 30 that is formed in a side surface of the outer body 24.

The first valve module 40A will now be described with reference to FIG. 5 and FIG. 7. The first valve module 40A has a function of serving as a speed controller and includes a cylindrical module body 41 that is attachable to the first body portion 10a by being inserted into the first attachment hole 11 and a valve mechanism 42 that is assembled to the module body 41. The valve mechanism 42 includes a check valve body 43 and a needle valve body 44.

The module body 41 includes an end fitting portion 41a that is airtightly fitted into an end of the connection hole 18 and that has a small diameter, a separated flow path forming portion 41b that has a diameter larger than that of the end fitting portion 41a, a valve body holding portion 41c that holds the needle valve body 44, and a handle attachment portion 41d to which a handle 45 that causes the needle valve body 44 to move forward and rearward is attached, and these portions 41a, 41b, 41c, and 41d are arranged along a central axis (the first axis L1) in this order starting from a tip end side toward a base end side so as to be connected to one another into one piece. The handle attachment portion 41d projects outward from the first body portion 10a.

The separated flow path forming portion 41b causes a portion of the fluid flow path to be separated into a first flow path 46 and a second flow path 47 that are parallel to each other, and an O-ring 48 is disposed between the outer periphery of the separate flow path forming portion 41b and the inner periphery of the first attachment hole 11.

The first flow path 46 is formed of a plurality of flow path holes extending through the separated flow path forming portion 41b in the direction of the first axis L1, and the second flow path 47 is formed of a center hole passing through the center of the end fitting portion 41a and the center of the separated flow path forming portion 41b. Accordingly, in the following description, each of the flow path holes may sometimes be denoted by the reference sign 46, and the center hole may sometimes be denoted by the reference sign 47.

A base end portion of the first flow path 46 and a base end portion of the second flow path 47 communicate with the first attachment hole 11 at positions closer to the valve body holding portion 41c than the O-ring 48 is through a plurality of communication holes 50 that are formed in a side surface of the module body 41. A tip end portion of the first flow path 46 communicates with the connection hole 18 at a position closer to the end fitting portion 41a than the O-ring 48 is through the first attachment hole 11 and a flow path hole 51 that is formed in the module body 41. A tip end portion of the second flow path 47 directly communicates with the connection hole 18.

The check valve body 43 that is formed of an elastic body made of, for example, a synthetic rubber and that has an annular and plate-like shape is fitted onto the outer periphery of the base end portion of the end fitting portion 41a. The check valve body 43 is caused to move into and out of contact with an end surface 41e of the separated flow path forming portion 41b by the action of the pressure fluid, so that the first flow path 46 is opened and closed.

An end portion of the check valve body 43 located on the inner diameter side thereof is clamped between a hole edge of the connection hole 18 and an inner diameter end of the separated flow path forming portion 41b, so that the check valve body 43 is fixed between an inner end surface 11a of the first attachment hole 11 and the end surface 41e of the separated flow path forming portion 41b. The inner end surface 11a of the first attachment hole 11 and the end surface 41e of the separated flow path forming portion 41b form conical surfaces each of which is inclined in a direction in which the gap between these conical surfaces increases in the radial direction of the first attachment hole 11.

In the present embodiment illustrated in FIG. 1 to FIG. 8, in the case where the pressure fluid flows in the forward direction from the input port 13 toward the output port 14, the check valve body 43 moves away from the end surface 41e of the separated flow path forming portion 41b by the action of the pressure fluid flowing in the forward direction and opens the first flow path 46 in such a manner as to allow the flow the pressure fluid. In the case where the pressure fluid flows in the backward direction from the output port 14 toward the input port 13, the check valve body 43 comes into contact with the end surface 41e of the separated flow path forming portion 41b by the action of the pressure fluid flowing in the backward direction and closes the first flow path 46 in such a manner as to block the flow of the pressure fluid.

The needle valve body 44 is airtightly disposed in a valve holding hole 53, which is formed in the valve body holding portion 41c so as to be located at the center of the valve body holding portion 41c, with a valve seal 54 interposed between the needle valve body 44 and the valve body holding portion 41c so as to be capable of moving forward and rearward along the first axis L1. A throttle portion 44a that is formed at an end of the needle valve body 44 is fitted into the second flow path 47, and a throttle hole 44b is formed in a side surface of the throttle portion 44a. The throttle hole 44b is inclined in a direction in which the cross-sectional area thereof gradually increases toward an end of the throttle portion 44a. When the depth of entry of the throttle portion 44a into the second flow path 47 increases as a result of the needle valve body 44 moving forward, the opening area of the throttle hole 44b (i.e., the second flow path 47) decreases. Conversely, when the depth of entry of the throttle portion 44a into the second flow path 47 decreases as a result of the needle valve body 44 moving rearward, the opening area of the throttle hole 44b (i.e., the second flow path 47) increases. As a result, the flow rate of the pressure fluid flowing through the second flow path 47 is controlled.

Since the needle valve body 44 is operated so as to move forward and rearward, an external thread 44c is cut on the outer periphery of the needle valve body 44, and the external thread 44c engages a threaded bore of a needle guide 55 that is fixed to the inside of the valve body holding portion 41c. The handle 45 that has a cap-like shape and that is used for performing a turning operation is rotatably mounted on the handle attachment portion 41d, which is formed at the base end portion of the module body 41. An end portion of the needle valve body 44 is inserted in an operation hole 45a formed at the center of the handle 45 in such a manner that the end portion of the needle valve body 44 and the handle 45 are fixed to each other in a rotation direction about the first axis L1 while being displaceable relative to each other in the direction of the first axis L1. Thus, the needle valve body 44 rotates in the forward and reverse directions when the handle 45 is rotated in the forward and reverse directions, and the needle valve body 44 moves forward and rearward in the direction of the first axis L1 by being guided by the needle guide 55.

A display 45b that indicates a relationship between the direction of rotation of the handle 45 and the opening degree of the needle valve body is provided on the outer surface of the handle 45, and a protrusion 45c that serves as an indicator indicating an operating direction, an operating degree, and the like is provided on a side surface of the handle 45.

In addition, the handle 45 is movable along the first axis L1 to a locking position and to a non-locking position. The handle 45 is moved to the non-locking position when the needle valve body 44 is operated so as to move forward or rearward, and the handle 45 is moved to the locking position when the needle valve body 44 is not operated so as to move forward or rearward. Since a configuration for this operation is commonly known, further detailed description thereof will be omitted.

The first valve module 40A, which is configured as described above, is inserted in the first attachment hole 11 of the first body portion 10*a* with a cylindrical attachment 57 interposed between the first valve module 40A and the first body portion 10*a*, the attachment 57 being airtightly fixed to an outer portion of the module body 41. In a state where the attachment 57 is positioned by being clamped between a step portion 11*b* of the first attachment hole 11 and a flange portion 41*f* of the module body 41, the outer periphery of the attachment 57 is airtightly fixed to the inner periphery of the first attachment hole 11, so that the first valve module 40A is attached to the first body portion 10*a*. It can be said that the attachment 57 is a portion of the first valve module 40A.

In the first valve module 40A, the flow of the pressure fluid in the forward direction from the input port 13 toward the output port 14 becomes a free flow as a result of the check valve body 43 opening the first flow path 46. Regarding the flow of the pressure fluid in the backward direction from the output port 14 toward the input port 13, since the check valve body 43 closes the first flow path 46, the pressure fluid flows through the second flow path 47, and the flow rate of the pressure fluid is controlled by the needle valve body 44.

The second valve module 70A will now be described with reference to FIG. 5 and FIG. 8. The second valve module 70A has a function of serving as a pilot check valve and includes a cylindrical module body 71 that is attachable to the second body portion 10*b* by being inserted into the second attachment hole 12 the second body portion 10*b* and a valve mechanism 72 that is assembled to the module body 71. The valve mechanism 72 includes a check valve body 73 and a pilot valve body 74 that displaces the check valve body 73 to a non-return position and to a full open position, and the valve mechanism 72 has a pilot port 75 through which a pilot fluid is supplied to the pilot valve body 74.

Note that the term "non-return position" refers to a position where the check valve body 73 can exhibit its original non-return function, and the term "full open position" refers to a position where the check valve body 73 fully opens a flow path and cannot exhibit the non-return function.

The module body 71 has an elbow shape and includes a cylindrical valve accommodating unit 76 that is fixed in place by being inserted into the second attachment hole 12 with a ring-shaped attachment 79 interposed therebetween and a cylindrical port forming portion 77 that perpendicularly extends from the valve accommodating unit 76. The axis of the port forming portion 77 is oriented parallel to the third axis L3.

The pilot port 75 is formed in the port forming portion 77, and a simple connection pipe joint 78 is attached to the pilot port 75. The pipe joint 78 has a configuration that is the same as that of the pipe joint 20, which is attached to the input port 13 of the third body portion 10*c*.

The valve accommodating unit 76 has a valve accommodating hole 80 extending along the second axis L2, and a valve rod 81 is accommodated in the valve accommodating hole 80 so as to be capable of being displaced along the second axis L2.

An end portion of the valve accommodating hole 80 is open in the second attachment hole 12, and a base end portion of the valve accommodating hole 80 communicates with the pilot port 75 through a piston chamber 82 and a communication hole 83. An intermediate portion of the valve accommodating hole 80 communicates with the second attachment hole 12 (i.e., the connection hole 18) through a plurality of communication holes 84 that are formed in a side surface of the valve accommodating unit 76.

The O-ring 48 and the check valve body 73 that is formed of a lip seal member are arranged between the outer periphery of the valve rod 81 and the inner periphery of the valve accommodating hole 80. The O-ring 48 is disposed at a position that is closer to the base end of the valve rod 81 than the communication holes 84 are, and the check valve body 73 is disposed at a position that is closer to the tip end of the valve rod 81 than the communication holes 84 are.

The check valve body 73 is disposed in such a manner that a lip 73*a* faces toward the tip end of the valve rod 81. Thus, in the case where the pressure fluid flows in the forward direction from the input port 13 toward the output port 14, the lip 73*a* of the check valve body 73 moves away from the inner periphery of the valve accommodating hole 80 and opens a flow path in such a manner as to allow the flow of the pressure fluid, and in the case where the pressure fluid flows in the backward direction from the output port 14 toward the input port 13, the lip 73*a* of the check valve body 73 comes into contact with the inner periphery of the valve accommodating hole 80 and closes the flow path in such a manner as to block the flow of the pressure fluid.

A piston 86 that functions as a pilot valve body is integrally formed with a base end portion of the valve rod 81, and the piston 86 is slidably accommodated in a piston chamber 82 with a seal member 86*a* interposed therebetween. The piston 86 has a diameter larger than that of the valve rod 81. A pilot pressure chamber 88 is formed between the rear surface of the piston 86 and a lid 87 that closes an end of the piston chamber 82, and the pilot pressure chamber 88 communicates with the pilot port 75 through the communication hole 83. In contrast, an opening chamber 89 that is formed between the front surface of the piston 86 and the O-ring 48 is in communication with the outside through the opening hole 89*a*, and a return spring 90 is disposed between the front surface of the piston 86 and a step portion 76*a* of the valve accommodating unit 76.

Figure 8:
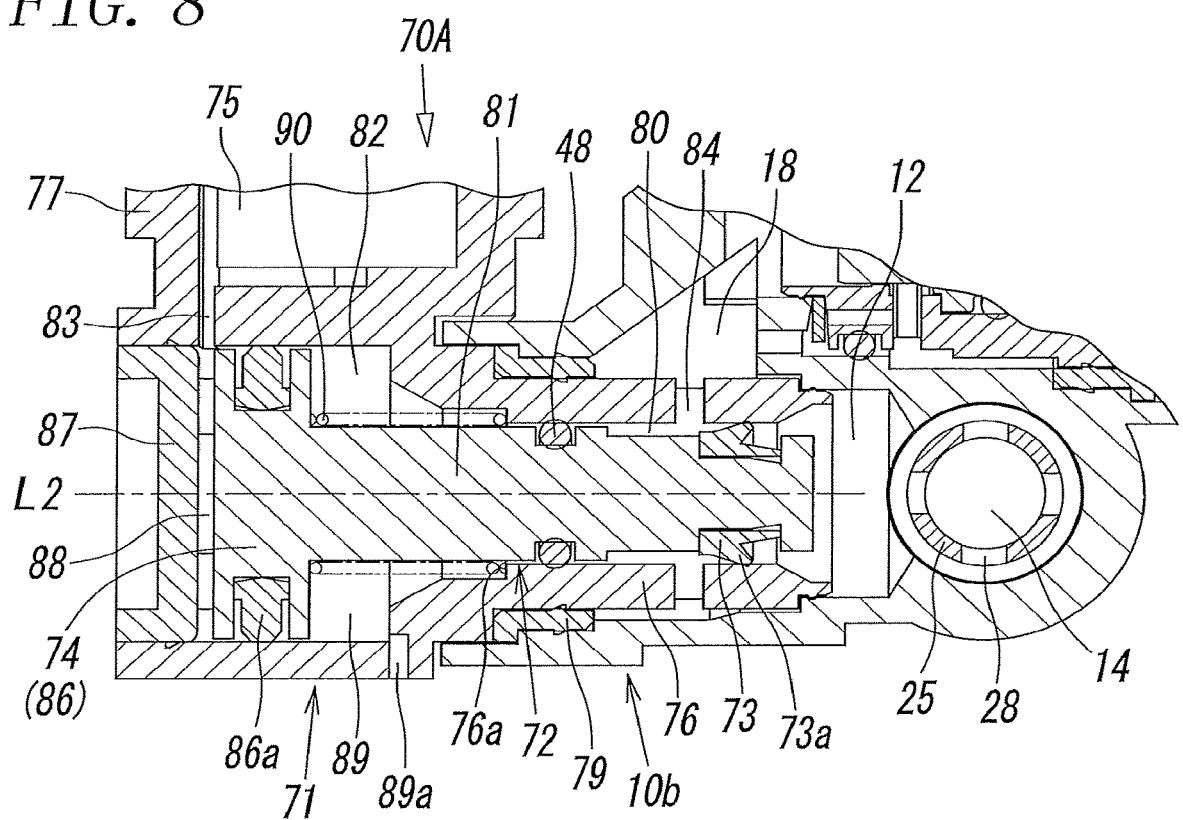
FIG. 8 is an enlarged view of a pilot check valve illustrated in FIG. 5.
Figure 9:
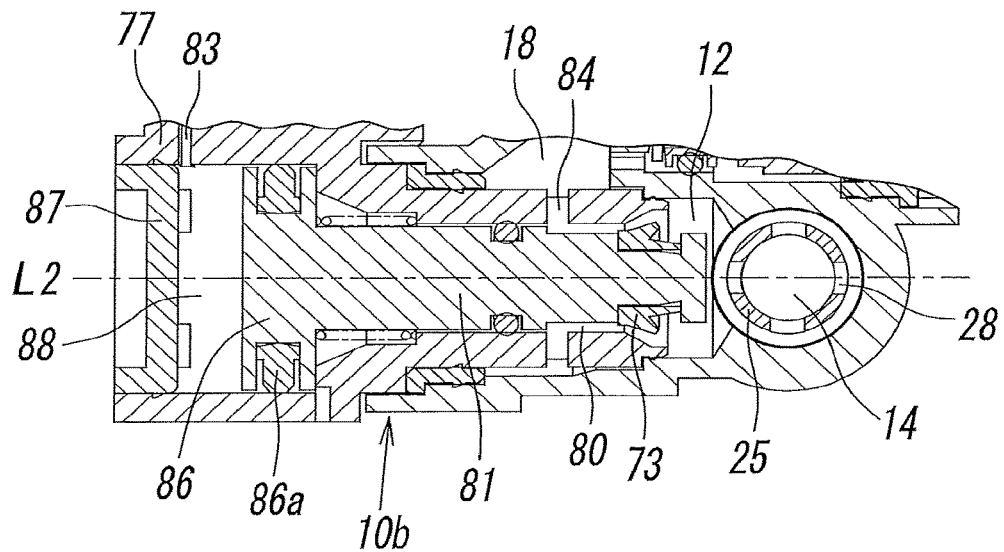
FIG. 9 is a cross-sectional view illustrating a principal portion and illustrating another operating state of the pilot check valve.

In the second valve module 70A, in the state illustrated in FIG. 5 and FIG. 8, when the pilot fluid is supplied to the pilot pressure chamber 88 through the pilot port 75, the valve rod 81 is caused by the piston 86 to move forward along the second axis L2 as illustrated in FIG. 9, and thus, the check valve body 73 occupies the full open position where the check valve body 73 projects forward from the valve accommodating hole 80. In this state, the flow of the pressure fluid in the forward direction from the input port 13 toward the output port 14 and the flow of the pressure fluid in the backward direction from the output port 14 toward the input port 13 are both free flows.

When supply of the pilot fluid is stopped, as illustrated in FIG. 5 and FIG. 8, the piston 86 and the valve rod 81 are caused to move rearward by the return spring 90, and the check valve body 73 is fitted into the valve accommodating hole 80 so as to occupy the non-return position. In this state, the flow of the pressure fluid in the forward direction from the input port 13 toward the output port 14 is allowed, and the flow of the pressure fluid in the backward direction from the output port 14 toward the input port 13 is blocked.

The first composite valve 1A, which is formed as described above, is used by, for example, being directly attached to the port 111 (see FIG. 4 and FIG. 6) of the air cylinder 110 and controls supplying and discharging of the pressure fluid to and from the air cylinder 110. As an example, the first composite valve 1A performs control as follows.

The pilot fluid is supplied to the pilot port 75 of the second valve module 70A by a pilot fluid switching valve (not illustrated), so that the check valve body 73 is maintained at the full open position, which is illustrated in FIG. 9. In this state, the input port 13 is alternately connected to a pressure fluid source and to the atmosphere by a main fluid switching valve (not illustrated).

Figure 7:
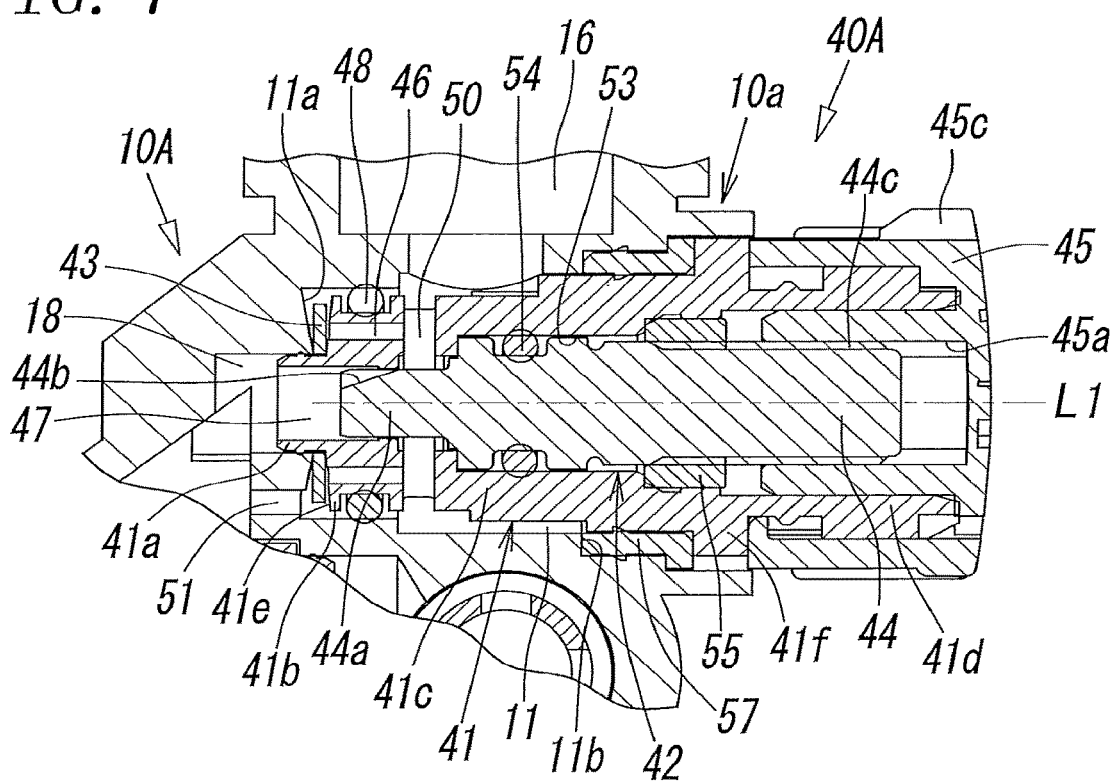
FIG. 7 is an enlarged view of a first valve module illustrated in FIG. 5.

When the input port 13 is connected to the pressure fluid source, in FIG. 5 and FIG. 7, the pressure fluid flowing from the third body portion 10c into the first body portion 10a, that is, the flow of the pressure fluid in the forward direction, pushes the check valve body 43 of the first valve module 40A open, and the pressure fluid in a free-flow state flows through the first flow path 46 and reaches the second body portion 10b and the second valve module 70A through the connection hole 18. In FIG. 9, the pressure fluid subsequently passes through the valve accommodating hole 80 of the second valve module 70A and reaches the fourth body portion 10d. Then, the pressure fluid passes through the output hole 19 and flows into a pressure chamber of the air cylinder through the output port 14, such that the air cylinder performs a working stroke.

When the air cylinder performs a return stroke, the input port 13 is connected to the atmosphere by the main fluid switching valve, so that the pressure fluid discharged from the pressure chamber of the air cylinder, that is, the flow of the pressure fluid in the backward direction, reaches the input port 13 by flowing along a path that is opposite to the path for the pressure fluid when the working stroke is performed, and the pressure fluid is discharged to the atmosphere through the main fluid switching valve. In this case, in the first valve module 40A, the check valve body 43 closes the first flow path 46 and blocks the flow of the pressure fluid in the backward direction, and thus, the pressure fluid flows through the second flow path 47 while the flow rate thereof is controlled by the needle valve body 44. Consequently, the air cylinder performs the return stroke at a speed corresponding to the flow rate of the pressure fluid. Therefore, the first valve module 40A is a speed controller that employs a meter-out system.

In the case where an abnormality occurs in the fluid pressure circuit, and supply of the pressure fluid is suddenly stopped while the air cylinder is operating, supply of the pressure fluid to the input port 13 is stopped, and supply of the pilot fluid to the second valve module 70A is also stopped. Consequently, in the second valve module 70A, as illustrated in FIG. 5 and FIG. 8, the piston 86 and the valve rod 81 are caused to move rearward by the return spring 90, and the check valve body 73 is fitted into the valve accommodating hole 80 so as to occupy the non-return position. Thus, the flow of the pressure fluid in the backward direction from the output port 14 toward the input port 13 is blocked by the second valve module 70A. The pressure fluid is contained in the pressure chamber of the air cylinder, and the air cylinder stops at an operating position thereof. As a result, a risk that the air cylinder will unexpectedly perform the return stroke can be avoided.

In addition to the above-described usage of the first composite valve 1A, for example, depending on the configuration of the fluid pressure circuit, the first composite valve 1A can be used in such a manner that, when the air cylinder is driven, that is, when the pressure fluid flows in the forward direction from the input port 13 toward the output port 14, the pilot fluid is not supplied to the pilot port 75 (and thus the check valve body 73 occupies the non-return position) and in such a manner that, when the air cylinder returns, that is, when the pressure fluid flows in the backward direction from the output port 14 toward the input port 13, the pilot fluid is supplied to the pilot port 75 (and thus the check valve body 73 occupies the full open position).

Figure 10:
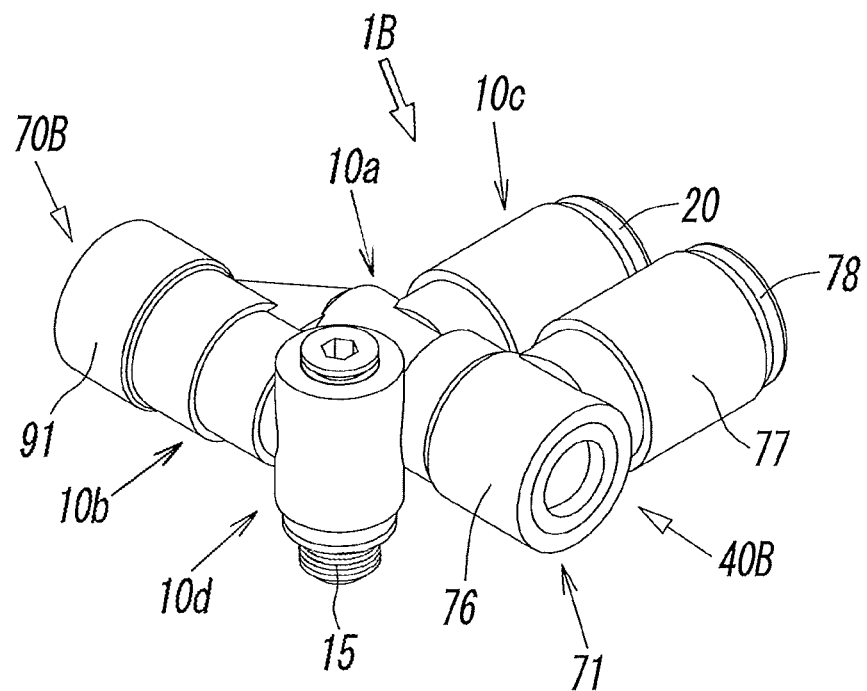
FIG. 10 is a perspective view of a composite valve according to a second embodiment of the present invention.
Figure 11:
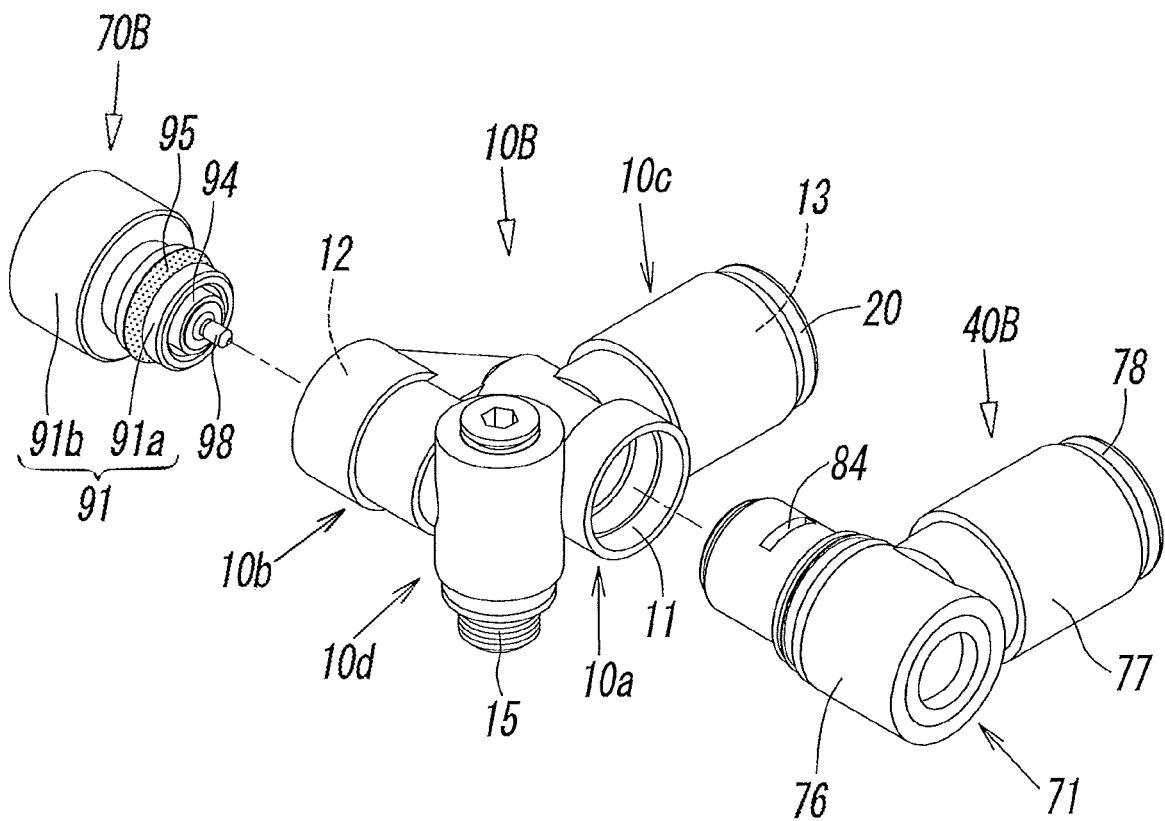
FIG. 11 is an exploded view of FIG. 10.
Figure 11:
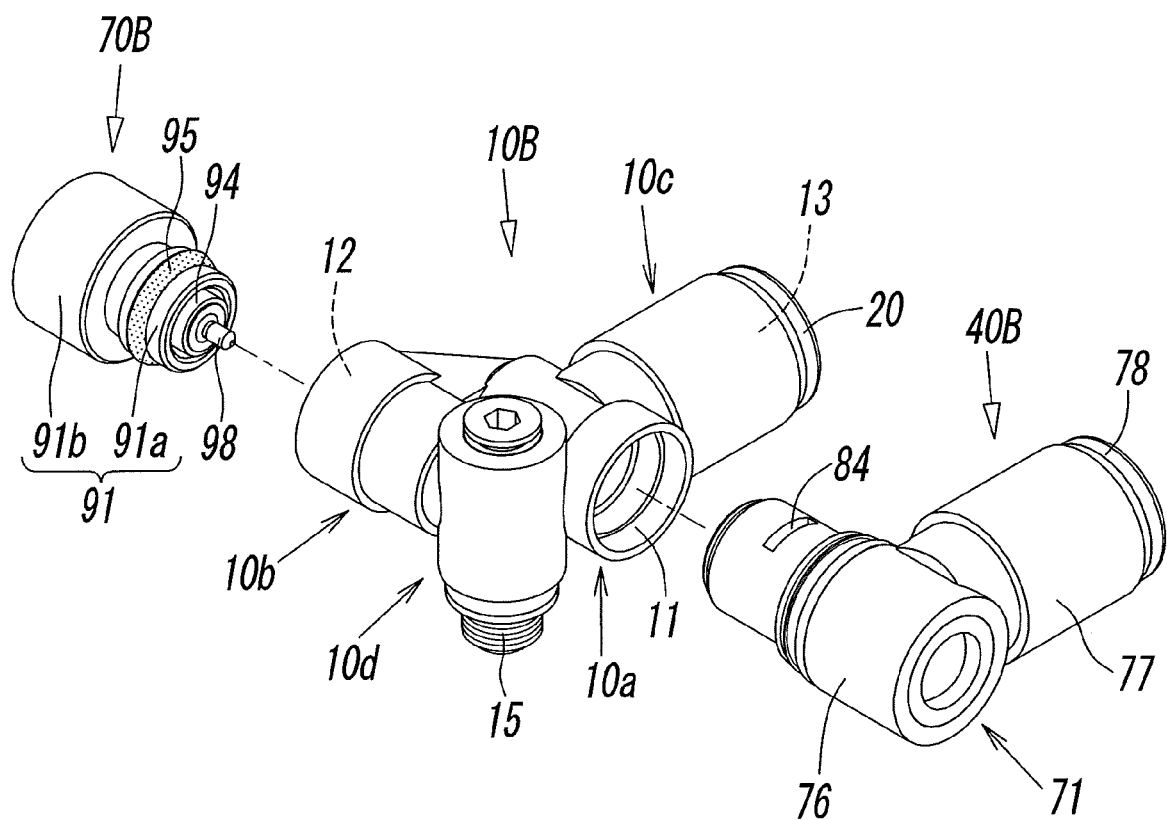
Figure 12:
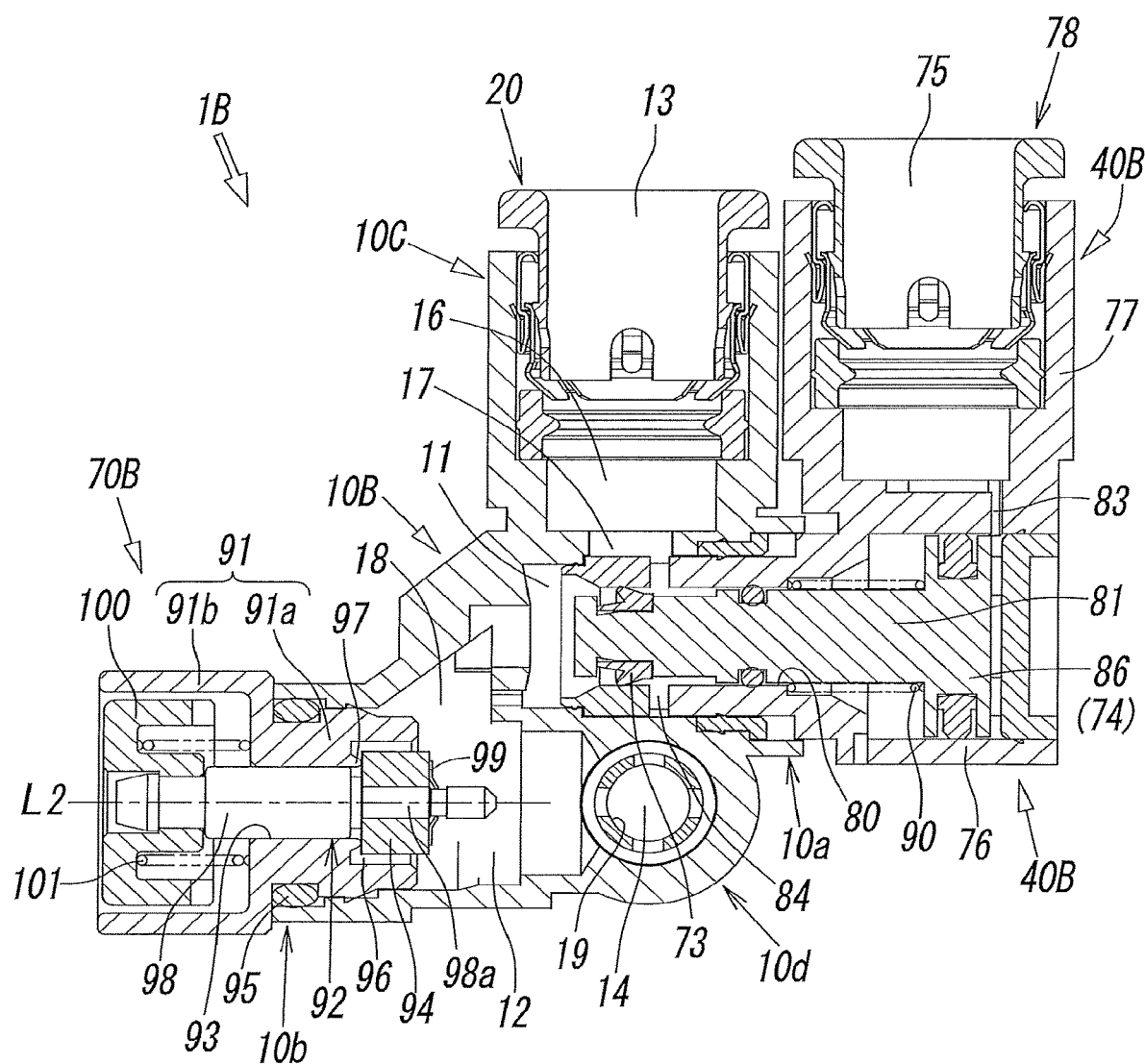
FIG. 12 is a transverse sectional view of FIG. 10 taken along a line similar to that of FIG. 5.

FIG. 10 to FIG. 12 illustrate a second composite valve 1B, which is a second embodiment of the composite valve. In the second composite valve 1B, a first valve module 40B that is attached to the first body portion 10a of a valve body 10B has a function of serving as a pilot check valve, and a second valve module 70B that is attached to the second body portion 10b has a function of serving as a residual pressure discharge valve. By using such a combination of valve modules, when supply of the pressure fluid is suddenly stopped while the air cylinder is operating, the first valve module 40B and the second valve module 70B of the second composite valve 1B can cause the pressure fluid to be contained in the air cylinder and can cause the air cylinder to stop at the operating position thereof, and in addition, the second valve module 70B of the second composite valve 1B can cause the contained pressure fluid (residual pressure) to be discharged to the outside.

The configuration of the valve body 10B in the second composite valve 1B is the same as the configuration of the valve body 10A in the first composite valve 1A. Thus, principal components of the valve body 10B are denoted by the same reference signs as those denoting the components of the valve body 10A, and detailed descriptions thereof will be omitted.

In addition, the first valve module 40B is a pilot check valve and is the same as the second valve module 70A, which is assembled to the first composite valve 1A. Thus, principal components of the first valve module 40B are also denoted by the same reference signs as those denoting the components of the second valve module 70A, and detailed descriptions of the configurations and the operations thereof will be omitted.

It is understood from the above description that the first valve module 40B can be attached to the first attachment hole 11 of the first body portion 10a and to the second attachment hole 12 of the second body portion 10b.

In contrast, the second valve module 70B includes a cylindrical module body 91 that is attachable to the second body portion 10b by being inserted into the second attachment hole 12 and a valve mechanism 92 that is assembled to the module body 91. The valve mechanism 92 includes a discharge flow path 93 that causes the second attachment hole 12 to communicate with the outside and a discharge valve body 94 that opens and closes the discharge flow path 93.

The module body 91 includes an insertion portion 91a that is airtightly inserted into the second attachment hole 12 with an O-ring 95 interposed therebetween and a button accommodating portion 91b that has a diameter larger than that of the insertion portion 91a and that is in communication with the outside, and the button accommodating portion 91b projects outward from the second body portion 10b.

The discharge flow path 93 is formed in the insertion portion 91a so as to be located at the center of the insertion portion 91a and allows the second attachment hole 12 and the button accommodating portion 91b to communicate with each other. A valve chamber 96 having a diameter larger than that of the discharge flow path 93 is formed at an end (an inner end) of the insertion portion 91a so as to face the second attachment hole 12, and a discharge valve seat 97 surrounding the discharge flow path 93 is formed in the valve chamber 96.

A discharge valve rod 98 is inserted in the discharge flow path 93 in such a manner that the discharge valve rod 98 is capable of sliding in the direction of the second axis L2 while a small gap through which a fluid flows is maintained between the outer periphery of the discharge valve rod 98 and the inner periphery of the discharge flow path 93. A leading end portion of the discharge valve rod 98 reaches the second attachment hole 12 by passing through the valve chamber 96, and a trailing end portion of the discharge valve rod 98 projects in the button accommodating portion 91b.

A valve body attachment portion 98a having a small diameter is formed at the leading end portion of the discharge valve rod 98, and the discharge valve body 94 is attached to the valve body attachment portion 98a so as to be capable of being displaced in the direction of the second axis L2. The discharge valve body 94 is continuously urged toward a discharge valve seat 97 by a valve spring 99.

An operating button 100 is mounted on a portion of the trailing end portion of the discharge valve rod 98, the portion projecting in the button accommodating portion 91b. The operating button 100 is continuously urged by a return spring 101 in a direction in which the discharge valve rod 98 is moved rearward, that is, a direction in which the discharge valve body 94 is brought into contact with the discharge valve seat 97, the return spring 101 being disposed between the operating button 100 and the module body 91.

Since the second valve module 70B is configured as described above, the discharge valve body 94 usually occupies a closing position where the discharge valve body 94 is in contact with the discharge valve seat 97 by the spring force of the valve spring 99 and the spring force of the return spring 101, and the discharge flow path 93 is closed. Thus, the pressure fluid in the second attachment hole 12 is not discharged to the outside.

In this state, when the operating button 100 is pushed by a hand, the discharge valve rod 98 moves forward, and the discharge valve body 94 moves away from the discharge valve seat 97. This opens the discharge flow path 93, and the pressure fluid in the second attachment hole 12 passes through the gap between the outer periphery of the discharge valve rod 98 and the inner periphery of the discharge flow path 93 and is discharged to the outside through the inside of the button accommodating portion 91b while the flow rate thereof is controlled. Therefore, the gap between the outer periphery of the discharge valve rod 98 and the inner periphery of the discharge flow path 93 forms a throttle.

In the second composite valve 1B, which has the above-described configuration, when the fluid pressure circuit operates normally, the pilot fluid is supplied to the pilot port 75 of the first valve module 40B, so that the piston 86 and the valve rod 81 move forward, and the check valve body 73 occupies the full open position. In this state, the input port 13 is alternately connected to the pressure fluid source and to the atmosphere by the main fluid switching valve. In this case, the discharge valve body 94 of the second valve module 70B closes the discharge flow path 93 by being in contact with the discharge valve seat 97.

When the input port 13 is connected to the pressure fluid source, the pressure fluid flowing into the third body portion 10c passes through the first valve module 40B while being in the free-flow state. Subsequently, the pressure fluid passes through the connection hole 18 and the second attachment hole 12 and reaches the fourth body portion 10d. Then, the pressure fluid passes through the output hole 19 and flows into the pressure chamber of the air cylinder through the output port 14, so that the air cylinder performs the working stroke.

When the air cylinder performs the return stroke, the input port 13 is connected to the atmosphere by the main fluid switching valve, and the pressure fluid discharged from the pressure chamber of the air cylinder, that is, the flow of the pressure fluid in the backward direction, reaches the input port 13 by flowing along the path that is opposite to the path for the pressure fluid when the working stroke is performed, and the pressure fluid is discharged to the atmosphere through the main fluid switching valve.

In the case where an abnormality occurs in the fluid pressure circuit, and supply of the pressure fluid is suddenly stopped while the air cylinder is operating, supply of the pressure fluid to the input port 13 is stopped, and supply of the pilot fluid to the first valve module 40B is also stopped. Consequently, in the first valve module 40B, as illustrated in FIG. 12, the piston 86 and the valve rod 81 are caused to move rearward by the return spring 90, and the check valve body 73 is fitted into the valve accommodating hole 80 so as to occupy the non-return position. Thus, the flow of the pressure fluid in the backward direction from the output port 14 toward the input port 13 is blocked by the first valve module 40B. Since the second valve module 70B is also in a valve closing state, the pressure fluid is contained in the pressure chamber of the air cylinder, and the air cylinder stops at an operating position thereof. As a result, a risk that the air cylinder will unexpectedly perform the return stroke can be avoided.

When the air cylinder is caused to return, the operating button 100 of the second valve module 70B is pushed by a hand, so that the discharge valve body 94 is moved out of contact with the discharge valve seat 97 in such a manner that the discharge flow path 93 is opened. As a result, the pressure fluid contained in the air cylinder is gradually discharged by passing through the gap between the outer periphery of the discharge valve rod 98 and the inner periphery of the discharge flow path 93, and thus, the air cylinder performs the return stroke at a speed corresponding to the discharge flow rate.

In addition to the above-described usage of the second composite valve 1B, for example, depending on the configuration of the fluid pressure circuit, the second composite valve 1B can be used in such a manner that, when the air cylinder is driven, that is, when the pressure fluid flows in the forward direction from the input port 13 toward the output port 14, the pilot fluid is not supplied to the pilot port 75 (and thus the check valve body 73 occupies the non-return position) and in such a manner that, when the air cylinder returns, that is, when the pressure fluid flows in the backward direction from the output port 14 toward the input port 13, the pilot fluid is supplied to the pilot port 75 (and thus the check valve body 73 occupies the full open position).

Figure 13:
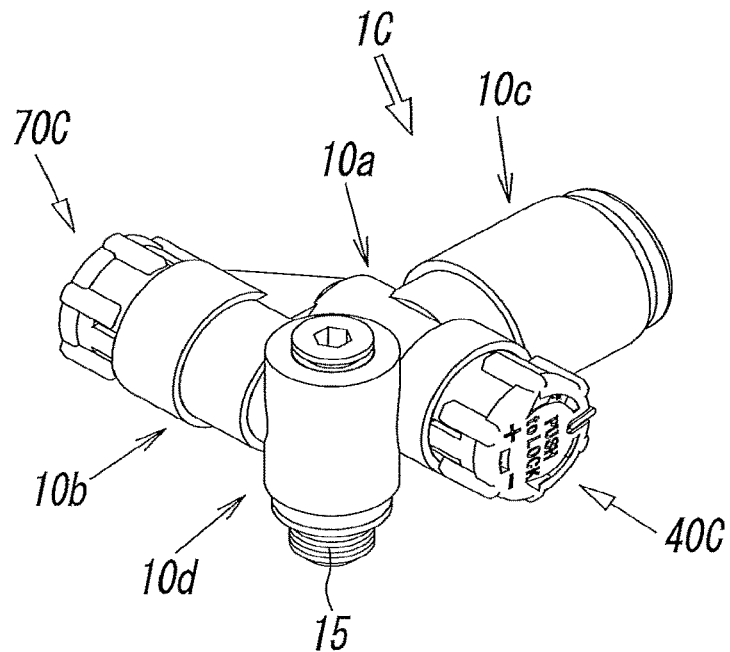
FIG. 13 is a perspective view of a composite valve according to a third embodiment of the present invention.
Figure 14:
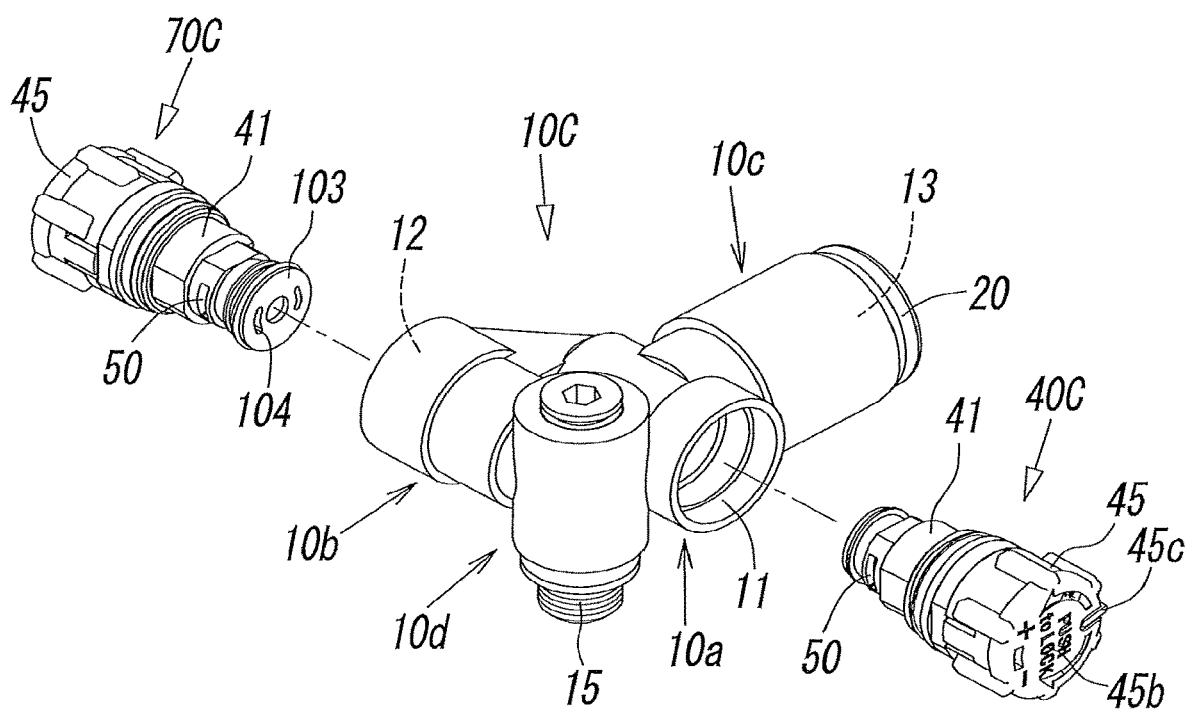
FIG. 14 is an exploded view of FIG. 13.
Figure 15:
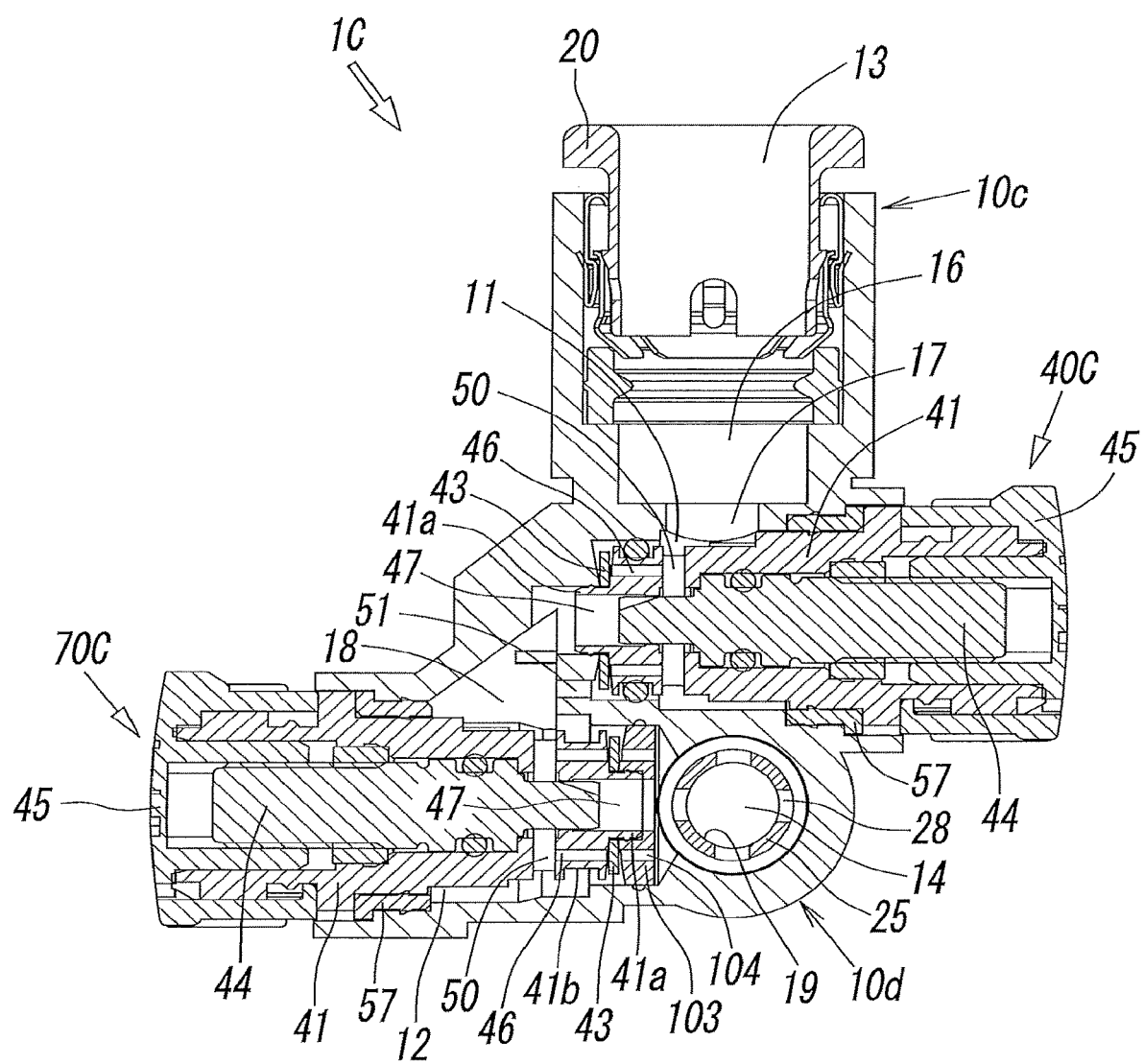
FIG. 15 is a transverse sectional view of FIG. 13 taken along a line similar to that of FIG. 5.

FIG. 13 to FIG. 15 illustrate a third composite valve 1C, which is a third embodiment of the composite valve. In the third composite valve 1C, a first valve module 40C that is attached to the first body portion 10a of a valve body 10C is a speed controller that employs a meter-out system, and a second valve module 70C that is attached to the second body portion 10b is a speed controller that employs a meter-in system. By using the two speed controllers, the operating speed of the air cylinder when the air cylinder performs the working stroke and the operating speed of the air cylinder when the air cylinder performs the return stroke can be controlled in various ways.

The configuration of the valve body 10C in the third composite valve 1C is the same as the configuration of the valve body 10A in the first composite valve 1A. Thus, principal components of the valve body 10C are denoted by the same reference signs as those denoting the components of the valve body 10A, and detailed descriptions thereof will be omitted.

The first valve module 40C, which is one of the two valve modules, is the same as the first valve module 40A in the first composite valve 1A. Thus, principal components of the first valve module 40C are also denoted by the same reference signs as those denoting the components of the first valve module 40A, and detailed descriptions of the configurations and the operations thereof will be omitted.

In contrast, the second valve module 70C has a configuration that is slightly different from that of the first valve module 40C, and the differences between second valve module 70C and the first valve module 40C are that a flow path forming member 103 is attached to the end fitting portion 41a in the module body 41 and that an O-ring is not attached to the outer periphery of the separated flow path forming portion 41b. The rest of the configuration of the second valve module 70C is the same as that of the first valve module 40C.

The flow path forming member 103 is an annular-shaped member and has a plurality of flow path holes 104 that are opened and closed by the check valve body 43. In the case where the pressure fluid flows in the forward direction from the input port 13 toward the output port 14, the flow path holes 104 are closed by the check valve body 43 so as to block the flow of the pressure fluid in the forward direction, and in the case where the pressure fluid flows in the backward direction from the output port 14 toward the input port 13, the flow path holes 104 are opened by the check valve body 43 so as to allow the flow of the pressure fluid in the backward direction.

In the third composite valve 1C, which has the above-described configuration, when the pressure fluid is supplied to the input port 13, the pressure fluid flows into the communication holes 50 of the first valve module 40C through the first attachment hole 11 and pushes the check valve body 43 open, so that the pressure fluid passes through the first flow path 46 while being in the free-flow state. Subsequently, the pressure fluid passes through the flow path hole 51 and the connection hole 18 and flows into the second attachment hole 12 and the second valve module 70C. Then, the pressure fluid that passes through the outer periphery of the module body 41, the communication holes 50, and the first flow path 46 and flows toward the flow path holes 104 of the flow path forming member 103 is blocked at this position because the check valve body 43 closes the flow path holes 104. In contrast, the pressure fluid that flows from the communication holes 50 through the second flow path 47 flows from the output hole 19 of the fourth body portion 10d through the output port 14 into the pressure chamber of the air cylinder while the flow rate thereof is controlled by the needle valve body 44. Thus, the air cylinder is driven at a speed corresponding to the flow rate of the pressure fluid supplied thereto, and a meter-in control is performed.

When the input port 13 is connected to the atmosphere at the time of the return stroke performed by the air cylinder, the pressure fluid discharged from the pressure chamber of the air cylinder reaches the input port 13 by flowing along the path that is opposite to the path for the pressure fluid when the working stroke is performed by the air cylinder, and the pressure fluid is discharged to the atmosphere through a switching valve. In this case, in the second valve module 70C, since the check valve body 43 opens the flow path holes 104 of the flow path forming member 103, the pressure fluid passes through the outer periphery of the module body 41 through the flow path holes 104 while being in the free-flow state and reaches the first valve module 40C through the connection hole 18. In the first valve module 40C, since the first flow path 46 is blocked by the check valve body 43, the pressure fluid flows through the second flow path 47 while the flow rate thereof is controlled by the needle valve body 44 and is discharged to the outside through the input port 13. Thus, the air cylinder moves rearward at a speed corresponding to the discharge flow rate of the pressure fluid, and a meter-out control is performed.

As described above, in the present invention, a plurality of valve mechanisms (valve modules) that are modularized for each control function are selectively attached to a single valve body, so that a composite valve that has a combination of control functions according to an application can be easily obtained. In addition, a plurality of body portions forming a valve body are arranged in a logical manner and compactly coupled to one another, so that a composite valve can be compactly attached, in a low position, to a port of a fluid pressure apparatus.

REFERENCE SIGNS LIST 1A, 1B, 1C composite valve
10A, 10B, 10C valve body
10a first body portion
10b second body portion
10c third body portion
10d fourth body portion
11 first attachment hole
12 second attachment hole
13 input port
14 output port
15 attachment portion
19 output hole
24 outer body
25 inner body
27 operation portion
40A, 40B, 40C first valve module
41 module body
42 valve mechanism
43 check valve body
44 needle valve body
70A, 70B, 70C second valve module
71, 91 module body
72, 92 valve mechanism
73 check valve body
74 pilot valve body
75 pilot port
93 discharge flow path
94 discharge valve body
L1 first axis
L2 second axis
L3 third axis
L4 fourth axis
H height

The invention claimed is:

1. A composite valve that is attached to a port of a fluid pressure apparatus, the composite valve comprising:
a valve body;
a first valve module attached to the valve body; and
a second valve module attached to the valve body,
wherein the valve body includes a first body portion having an attachment hole that is used for attaching the first valve module to the first body portion, a second body portion having an attachment hole that is used for attaching the second valve module to the second body portion, a third body portion having an input port that is used for injecting a pressure fluid into the third body portion, and a fourth body portion having an output port that is used for outputting the pressure fluid, the first body portion, the second body portion, the third body portion, and the fourth body portion being formed in such a manner as to be integrally coupled to one another,
wherein the fourth body portion includes an attachment portion that is formed in such a manner as to be directly screwed into and attached to a port of a fluid pressure apparatus, the port having a shape of a threaded hole,
wherein the first body portion and the second body portion respectively extend along a first axis and a second axis that are parallel to each other,
wherein the third body portion is located in a plane including either or both of the first axis and the second axis, or is located in a separate plane that is parallel to the plane and extends along a third axis that is at 90 degrees with respect to the first axis and with respect to the second axis,
wherein the fourth body portion extends along a fourth axis that is at 90 degrees with respect to all the first axis, the second axis, and the third axis,
wherein the first valve module includes a module body that is attachable to the first body portion by being inserted into the attachment hole of the first body portion and a valve mechanism that is assembled to the module body, and the second valve module includes a module body that is attachable to the second body portion by being inserted into the attachment hole of the second body portion and a valve mechanism that is assembled to the module body,
wherein the first valve module and the second valve module have different fluid control functions, and
wherein a fluid flow path that allows the input port and the output port to communicate with each other is formed in such a manner as to extend from the third body portion to the fourth body portion by sequentially passing through the first body portion, the first valve module, the second body portion, and the second valve module from one side to another side.

2. The composite valve according to claim 1,
wherein the first body portion, the second body portion, the third body portion, and the fourth body portion each have a hollow cylindrical shape,
wherein the first body portion and the second body portion are disposed at positions that are adjacent to each other in such a manner that the first body portion and the second body portion overlap each other, and
wherein a first attachment hole of the first body portion and a second attachment hole of the second body portion are open along the first axis and the second axis, respectively, and are oriented in opposite directions.

3. The composite valve according to claim 1,
wherein the third body portion and the fourth body portion are disposed at positions located on opposite sides with the first body portion or the second body portion interposed between the third body portion and the fourth body portion.

4. The composite valve according to claim 1,
wherein the first body portion, the second body portion, and the third body portion are arranged in such a manner that the entire first body portion, the entire second body portion, and the entire third body portion are fit into an area having a height of the fourth body portion.

5. The composite valve according to claim 1,
wherein the fourth body portion includes a hollow outer body and an inner body that has a cylindrical shape and that is accommodated in the outer body in such a manner as to be rotatable about the fourth axis,
wherein an upper end of the inner body is exposed to the outside from an upper end of the outer body, and a lower end of the inner body projects outward from a lower end of the outer body,
wherein an output hole is formed in the inner body, and an attachment portion and an output port are formed at a lower end portion of the inner body, and
wherein an operation portion that is used for performing a turning operation by using a wrench is formed at an upper end portion of the inner body.

6. The composite valve according to claim 1,
wherein the first valve module and the second valve module are each attachable to the first body portion and to the second body portion.

7. The composite valve according to claim 1,
wherein a combination of the first valve module and the second valve module is a combination of a speed controller and a pilot check valve, a combination of the pilot check valve and a residual pressure discharge valve, or a combination of the speed controller and another speed controller,
wherein a valve mechanism of each of the speed controllers includes a check valve body that controls a flow direction of the pressure fluid that flows through the fluid flow path and a needle valve that controls a flow rate of the pressure fluid,
wherein a valve mechanism of the pilot check valve includes a check valve body that controls a flow direction of the pressure fluid that flows through the fluid flow path, a pilot valve body that displaces, by an action of a pilot fluid, the check valve body to a position where the check valve allows a flow of the pressure fluid in a forward direction and a flow of the pressure fluid in a backward direction, and a pilot port that is used for supplying the pilot fluid to the pilot valve body, and
wherein a valve mechanism of the residual pressure discharge valve includes a discharge flow path that branches off from the fluid flow path and that communicates with the outside and a discharge valve body that opens and closes the discharge flow path.

* * * * *